United States Patent
Yonekura et al.

(10) Patent No.: US 8,962,204 B2
(45) Date of Patent: Feb. 24, 2015

(54) FUEL CELL SYSTEM AND METHOD OF CONTROLLING FUEL CELL SYSTEM

(75) Inventors: Kenji Yonekura, Sagamihara (JP); Masatoshi Iio, Yokosuka (JP); Hisashi Niioka, Yokohama (JP); Takatada Usami, Yokohama (JP); Hayato Chikugo, Yokosuka (JP); Mitsunori Kumada, Yokosuka (JP); Naoto Todoroki, Yokohama (JP); Ikuhiro Taniguchi, Atsugi (JP); Yoshinao Ootake, Atsugi (JP); Hitoshi Igarashi, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 443 days.

(21) Appl. No.: 12/675,375

(22) PCT Filed: Sep. 12, 2008

(86) PCT No.: PCT/IB2008/002418
§ 371 (c)(1),
(2), (4) Date: Feb. 25, 2010

(87) PCT Pub. No.: WO2009/040621
PCT Pub. Date: Apr. 2, 2009

(65) Prior Publication Data
US 2010/0304260 A1  Dec. 2, 2010

(30) Foreign Application Priority Data
Sep. 27, 2007  (JP) ................................. 2007-252264

(51) Int. Cl.
*H01M 8/04*  (2006.01)

(52) U.S. Cl.
CPC ...... *H01M 8/04014* (2013.01); *H01M 8/04097* (2013.01); *H01M 8/04328* (2013.01);
(Continued)

(58) Field of Classification Search
CPC ........................... H01M 8/04–8/04268; H01M 8/0413–8/04373; H01M 8/0438–8/04388; H01M 8/04402; H01M 8/04417; H01M 8/04694–8/04723
USPC .......... 429/408, 415, 427, 433–437, 440, 442
See application file for complete search history.

(56) References Cited

U.S. PATENT DOCUMENTS 5,290,641 A * 3/1994 Harashima .................... 429/431
5,700,595 A * 12/1997 Reiser ........................... 429/437
(Continued)

FOREIGN PATENT DOCUMENTS

| JP | 2005-216781 | 8/2005 |
|---|---|---|
| JP | 2005-216783 | 8/2005 |

(Continued)

*Primary Examiner* — Jonathan Crepeau
*Assistant Examiner* — Jacob Buchanan
(74) *Attorney, Agent, or Firm* — Young Basile

(57) ABSTRACT

A fuel cell stack includes a heat exchange unit that performs heat exchange between a gas mixture containing source hydrogen and a circulating gas and cooling water used for controlling the temperature of the fuel cell stack. A system controller adjusts the temperature of the cooling water by controlling a temperature control unit on the basis of the temperature of source hydrogen flowing into a junction at which the source hydrogen and a circulating gas are mixed such that the temperature of a source/recirculated hydrogen mixture that is mixed at the junction and that is supplied to the fuel cell stack is kept within a managed temperature range.

22 Claims, 8 Drawing Sheets

(52) U.S. Cl.
CPC ...... *H01M8/04335* (2013.01); *H01M 8/04343* (2013.01); *H01M 8/04358* (2013.01); *H01M 8/04365* (2013.01); *H01M 8/04388* (2013.01); *H01M 8/04395* (2013.01); *H01M 8/04552* (2013.01); *H01M 8/04582* (2013.01); *H01M 8/04708* (2013.01); *H01M 8/04723* (2013.01); *H01M 8/04753* (2013.01); *H01M 8/04761* (2013.01); *H01M 8/04768* (2013.01); *H01M 8/04805* (2013.01); *H01M 8/04992* (2013.01); *Y02E 60/50* (2013.01)
USPC ............ 429/434; 429/442; 429/415; 429/443

(56) References Cited

U.S. PATENT DOCUMENTS

| | | | |
|---|---|---|---|
| 7,118,820 B2 * | 10/2006 | Nuttall et al. | 429/413 |
| 2002/0051900 A1 * | 5/2002 | Okamoto et al. | 429/24 |
| 2002/0071981 A1 * | 6/2002 | Sano et al. | 429/30 |
| 2002/0146606 A1 * | 10/2002 | Kobayashi et al. | 429/24 |
| 2003/0011721 A1 | 1/2003 | Wattelet et al. | |
| 2003/0027024 A1 * | 2/2003 | Ilo et al. | 429/19 |
| 2003/0138688 A1 | 7/2003 | Hattori et al. | |
| 2004/0091761 A1 * | 5/2004 | Enjoji et al. | 429/32 |
| 2005/0112430 A1 | 5/2005 | Nuttall et al. | |
| 2006/0251943 A1 * | 11/2006 | Hatoh et al. | 429/32 |
| 2007/0065691 A1 * | 3/2007 | Maier et al. | 429/22 |
| 2009/0053564 A1 * | 2/2009 | Fellows | 429/13 |

FOREIGN PATENT DOCUMENTS

| | | | |
|---|---|---|---|
| JP | 2006-269223 | 10/2006 | |
| JP | 2006-294498 | 10/2006 | |
| JP | 2006-339103 | 12/2006 | |
| JP | 2007-012636 | 1/2007 | |
| JP | 2007-184196 A | 7/2007 | |
| WO | WO 2006100569 A1 * | 9/2006 | H01M 8/04 |

* cited by examiner

FUEL CELL SYSTEM AND METHOD OF CONTROLLING FUEL CELL SYSTEM

CROSS-REFERENCE TO RELATED APPLICATIONS

This application claims priority from Japanese Patent Application Serial No. 2007-252264, which is incorporated by reference by its entirety herein.

TECHNICAL FIELD

The invention relates to a fuel cell system and a method of controlling the same.

BACKGROUND

Fuel cell systems that include a fuel cell in which a fuel gas (e.g., hydrogen) is supplied to a fuel electrode and an oxidizer gas (e.g., air) is supplied to an oxidizer electrode, where the gases electrochemically react with each other to generate electric power are known.

For example, Japanese Unexamined Patent Application Publication No. 7-161371 discloses a method of controlling the temperature of a fuel cell. More specifically, in this method a part of an exhaust gas that has passed through an oxidizer electrode of the fuel cell is mixed with air that is supplied to the oxidizer electrode, and the gas mixture is circulated. In this case, the flow rate of the circulating gas that is discharged from the oxidizer electrode and then circulates is controlled such that the temperature of the gas at the inlet of the oxidizer electrode is kept within a predetermined range. In addition, the flow rate of the air is controlled such that the temperature of the exhaust gas at the outlet of the oxidizer electrode is kept within a predetermined range.

As another example, Japanese Unexamined Patent Application Publication No. 2007-184196 discloses a fuel cell system having a structure in which an unreacted fuel gas discharged from a fuel electrode is mixed with a fuel gas that is supplied to the fuel electrode, and the gas mixture is then circulated.

BRIEF SUMMARY

One fuel cell system disclosed herein includes a fuel cell that generates electric power by electrochemically reacting a reactant gas mixture, a reactant gas supply unit configured to supply a reactant gas and a gas circulation unit that is configured to mix a circulating reactant gas from the fuel cell with the reactant gas to supply the reactant gas mixture to the fuel cell. This exemplary fuel cell system further includes a temperature control unit that is configured to circulate a heat transfer medium between the temperature control unit and the fuel cell and to adjust the temperature of the heat transfer medium so that the temperature of the fuel cell is controlled, a gas temperature-detecting unit configured to detect, as a supplied-gas temperature, the temperature of the reactant gas mixture before the reactant gas mixture enters the fuel cell and a control unit configured to adjust the temperature of the heat transfer medium by controlling the temperature control unit on the basis of the supplied-gas temperature detected by the gas temperature-detecting unit such that the temperature of the reactant gas mixture is kept within a predetermined temperature range, wherein the fuel cell includes a heat exchange unit configured to perform heat exchange between the gas mixture supplied to the fuel cell and the heat transfer medium.

Other fuel cell systems and methods of controlling a fuel cell system are also disclosed herein.

BRIEF DESCRIPTION OF THE DRAWINGS

The description herein makes reference to the accompanying drawings wherein like reference numerals refer to like parts throughout the several views, and wherein.

DETAILED DESCRIPTION OF EMBODIMENTS OF THE INVENTION

The temperature of a gas supplied to a fuel cell may change in accordance with the environment. If the temperature of the gas is outside of a managed temperature range corresponding to characteristics of the fuel cell, the power generation performance of the fuel cell may be degraded.

Embodiments of the invention suppress the degradation of the power generation performance by controlling the temperature of a gas supplied to a fuel cell. A reactant gas is supplied from a reactant gas supply unit to a fuel cell, a gas discharged from the fuel cell is mixed with the reactant gas supplied from the reactant gas supply unit, and the gas mixture is then circulated in the fuel cell. In addition, by circulating a heat transfer medium between a temperature control unit and the fuel cell and adjusting the temperature of the heat transfer medium with the temperature control unit, the temperature of the fuel cell is controlled. This fuel cell includes a heat exchange unit that performs heat exchange between the gas mixture containing the reactant gas and the circulating gas and the heat transfer medium. Furthermore, a control unit controls the temperature control unit on the basis of the temperature of the reactant gas that flows into a junction at which the reactant gas and the circulating gas are mixed (supplied-gas temperature). Thereby, the control unit adjusts the temperature of the heat transfer medium such that the temperature of the gas mixture that is mixed at the junction and then supplied to the fuel cell is kept within a managed temperature range.

According to embodiments of the invention, the temperature of the circulating gas is adjusted by controlling the temperature of the heat transfer medium and performing heat exchange between the heat transfer medium and the reactant gas in the fuel cell, and the circulating gas and the reactant gas are then mixed with each other. Accordingly, the gas mixture can be heated or cooled such that the temperature of the gas mixture is kept within a managed temperature range. As a result, the temperature of the gas supplied to the fuel cell can be controlled to suppress the degradation of the power generation performance.

Figure 1:
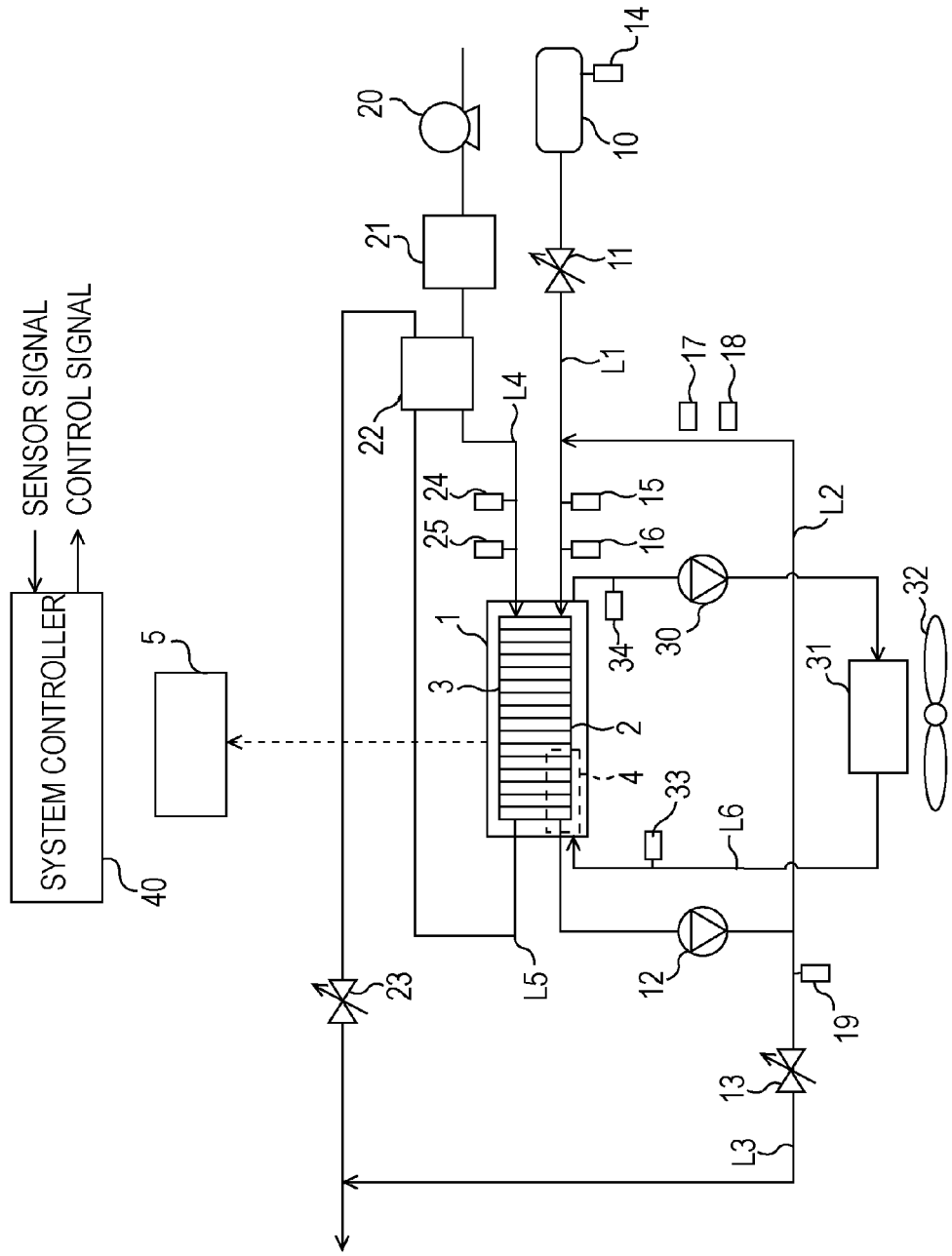
FIG. 1 is a block diagram showing the overall structure of a fuel cell system.

FIG. 1 is a block diagram showing the overall structure of a fuel cell system according to an embodiment of the invention. The fuel cell system may be installed in, for example, a vehicle that is driven by electric power supplied from the fuel cell system.

The fuel cell system includes a fuel cell stack (fuel cell) 1 in which a plurality of fuel cell structures are sandwiched between separators, and the fuel cell structures and separators are stacked. Each of the fuel cell structures includes a fuel electrode 2, an oxidizer electrode 3 and a solid polymer electrolyte membrane disposed therebetween. In the fuel cell stack 1, a fuel gas is supplied to each fuel electrode 2, and an oxidizer gas is supplied to each oxidizer electrode 3. Electric power is generated by allowing these reactant gases to electrochemically react with each other. In this embodiment, a description will be made of a case where hydrogen is used as the fuel gas and air is used as the oxidizer gas. However, it should be understood that other gases could be utilized as the fuel gas and the oxidizer gas.

The fuel cell system includes a hydrogen system for supplying the fuel cell stack 1 with hydrogen, an air system for supplying the fuel cell stack 1 with air and a cooling system for cooling the fuel cell stack 1.

In the hydrogen system, hydrogen used as the fuel gas is stored in a fuel tank 10 (e.g., high-pressure hydrogen cylinder) and is supplied from this fuel tank 10 to the fuel cell stack 1 through a hydrogen-supply flow path L1. More specifically, a fuel-tank source valve (not shown) is provided at the downstream of the fuel tank 10. When the fuel-tank source valve is opened, the pressure of high-pressure hydrogen gas supplied from the fuel tank 10 is automatically reduced to a predetermined pressure by a pressure-reducing valve (not shown) provided at the downstream of the fuel-tank source valve. The air pressure of the hydrogen gas whose pressure has been reduced is further reduced by a hydrogen pressure-regulating valve 11 provided at the downstream of the pressure-reducing valve, and the hydrogen is then supplied to the fuel cell stack 1. In this embodiment, the fuel tank 10 and the hydrogen pressure-regulating valve 11 constitute a reactant gas supply unit that supplies the fuel cell stack 1 with a reactant gas (hydrogen).

An exhaust gas (a gas containing unused hydrogen) discharged from the fuel electrode 2 is discharged from the fuel cell stack 1 to a hydrogen-circulating flow path L2. Another end of the hydrogen-circulating flow path L2 is connected to the hydrogen-supply flow path L1 at the downstream of the hydrogen pressure-regulating valve 11. A gas circulation unit such as a circulating pump 12 is provided in the hydrogen-circulating flow path L2. The exhaust gas discharged from the fuel electrode 2 is circulated through the hydrogen-circulating flow path L2 to the hydrogen-supply flow path L1 by driving the circulating pump 12. That is, a circulating gas flowing in the hydrogen-circulating flow path L2 (i.e., the exhaust gas discharged from the fuel electrode 2) is mixed with the reactant gas supplied from the fuel tank 10 by the circulating pump 12, and thus the gas mixture is circulated in the fuel cell stack 1. For the purpose of this specification, according to need, the hydrogen supplied from the fuel tank 10 is referred to as "source hydrogen", and the source hydrogen and the circulating gas that have been mixed with each other at a junction at which the circulating gas and the source hydrogen are mixed are referred to as "source/recirculated hydrogen mixture".

In the case where air is used as the oxidizer gas, impurities contained in air are transmitted from the oxidizer electrode 3 to the fuel electrode 2. Since the fuel electrode 2 is disposed along the hydrogen-circulating flow path L2, the amount of impurities in the hydrogen-circulating flow path L2 including the fuel electrode 2 increases, and thus the partial pressure of hydrogen tends to decrease. Here, the impurities are non-fuel gas components other than hydrogen used as the fuel gas. A typical example thereof is nitrogen. If the amount of nitrogen excessively increases, the output from the fuel cell stack 1 may decrease. Therefore, it is necessary to control the amount of nitrogen in the hydrogen-circulating flow path L2. For this purpose, a purge flow path L3 for discharging the circulating gas to the outside is provided in the hydrogen-circulating flow path L2. A purge valve (purge unit) 13 is provided in the purge flow path L3. The amount of nitrogen discharged to the outside through the purge flow path L3 can be adjusted by adjusting the opening of the purge valve 13. Accordingly, the amount of nitrogen contained in the fuel electrode 2 and the hydrogen-circulating flow path L2 can be controlled so as to maintain power generation performance.

In the air system, air used as the oxidizer gas is supplied, for example, as follows. Atmospheric air is taken by a compressor 20 and pressurized, and the pressurized air is supplied to the fuel cell stack 1 through an air-supply flow path L4. An aftercooler 21 and a moisturizing device 22 are provided in the air-supply flow path L4. The air supplied from the compressor 20 is cooled to a temperature suitable for a reaction of the fuel cell stack 1 by the aftercooler 21 and moisturized by the moisturizing device 22. The exhaust gas (the air in which oxygen therein has been consumed) discharged from the oxidizer electrode 3 is discharged to the outside through an air-discharge flow path L5. This air-discharge flow path L5 is provided through the moisturizing device 22. Accordingly, moisture exchange between the exhaust gas discharged from the oxidizer electrode 3 and air supplied from the compressor 20 is performed in the moisturizing device 22. Thereby, the air supplied from the compressor 20 is moisturized by the moisturizing device 22. In addition, an air pressure-regulating valve 23 is provided in the air-discharge flow path L5 to adjust the pressure of the air supplied to the fuel cell stack 1. In addition, an end of the purge flow path L3 is connected to the air-discharge flow path L5. Accordingly, hydrogen contained in the circulating gas discharged through the purge flow path L3 is diluted by the exhaust gas discharged from the oxidizer electrode 3 and then is released to the outside.

The cooling system includes a closed-loop cooling flow path L6 in which cooling water (heat transfer medium) that cools the fuel cell stack 1 is circulated. A cooling water-circulating pump 30 for circulating the cooling water is provided in the cooling flow path L6. The cooling water in the cooling flow path L6 is circulated by operating the cooling water-circulating pump 30. A radiator 31 and a fan 32 for sending air to the radiator 31 are further provided in the cooling flow path L6. The cooling water, whose temperature has been increased by cooling the fuel cell stack 1, flows to the radiator 31 through the cooling flow path L6 and is then cooled by the radiator 31. The cooled cooling water is supplied to the fuel cell stack 1. The cooling flow path L6 branches in many directions in the fuel cell stack 1. Thereby, the entire inside of the fuel cell stack 1 can be cooled. Here, the cooling water-circulating pump 30, the radiator 31 and the fan 32 function as a temperature control unit. By means of this temperature control unit, the cooling water is circulated between the temperature control unit and the fuel cell stack 1, and the temperature of the cooling water is adjusted, thus controlling the temperature of the fuel cell stack 1.

In addition, the fuel cell stack 1 of this embodiment includes a heat exchange unit 4. Heat exchange between the source/recirculated hydrogen mixture supplied to the fuel electrode 2 and the cooling water for cooling the fuel cell stack 1 is performed by the heat exchange unit 4. More specifically, the heat exchange unit 4 has a structure in which heat exchange is performed between hydrogen and the cooling water at the outlet side of hydrogen in the fuel cell stack 1 and the inlet side of the cooling water in the fuel cell stack 1. The temperature of hydrogen discharged from the fuel electrode 2 corresponds to (becomes substantially equal to) the temperature of the cooling water at the inlet of the fuel cell stack 1.

An electric power extraction device 5 is connected to the fuel cell stack 1. The electric power extraction device 5 is controlled by a system controller 40. The electric power extraction device 5 extracts electric power from the fuel cell stack 1 and supplies the extracted electric power to an electric motor (not shown) that drives the vehicle.

The system controller (control unit) 40 has a function of controlling the entire system. The system controller 40 operates in accordance with a control program, thereby controlling the operation state of the fuel cell stack 1. A microcomputer including a central processing unit (CPU), a read-only memory (ROM), a random-access memory (RAM) and an input/output (I/O) interface as main components can be used as the system controller 40. The system controller 40 performs various calculations on the basis of the state of the fuel cell system and outputs the calculation results as control signals to various types of actuators (not shown) to control various types of elements such as the hydrogen pressure-regulating valve 11, the circulating pump 12, the purge valve 13, the compressor 20, the air pressure-regulating valve 23, the cooling water-circulating pump 30, the fan 32 and the electric power extraction device 5. In addition, in order to detect the state of the fuel cell system, sensor signals output from various types of sensors are input to the system controller 40.

A tank-temperature sensor 14 detects the temperature of hydrogen stored in the fuel tank 10 (hereinafter referred to as "tank temperature"). A hydrogen-pressure sensor 15 detects the hydrogen pressure in the fuel electrode 2 of the fuel cell stack 1 (hereinafter referred to as "operating hydrogen pressure"). An inlet-temperature sensor 16 detects the temperature of hydrogen supplied to the fuel electrode 2 of the fuel cell stack 1 (hereinafter referred to as "inlet hydrogen temperature"). A circulating-hydrogen-concentration sensor 17 detects the hydrogen concentration contained in the circulating gas flowing in the hydrogen-circulating flow path L2 (hereinafter referred to as "circulating hydrogen concentration"). A circulation-flow-rate sensor 18 detects the flow rate of the circulating gas flowing in the hydrogen-circulating flow path L2. An exhaust-gas-temperature sensor 19 detects the temperature of the circulating gas discharged from the purge flow path L3. An air-pressure sensor 24 detects the air pressure in the oxidizer electrode 3 of the fuel cell stack 1 (hereinafter referred to as "operating air pressure"). An inlet-cooling-water-temperature sensor 33 detects the temperature of the cooling water supplied to the fuel cell stack 1, that is, the temperature of the cooling water at the inlet of the fuel cell stack 1 (hereinafter referred to as "inlet cooling water temperature"). An outlet-cooling-water-temperature sensor 34 detects the temperature of the cooling water discharged from the fuel cell stack 1, that is, the temperature of the cooling water at the outlet of the fuel cell stack 1 (hereinafter referred to as "outlet cooling water temperature"). The electric power extraction device 5 has a function of detecting the current value and the voltage value of each cell constituting the fuel cell stack 1 and the current value and the voltage value of the whole fuel cell stack 1 in order to control the extraction of electric power, and information about these values is input in the system controller 40.

Prior to a description of the specific structure of the system controller 40 and a method of controlling the system controller 40, a description will now be made of the concept of control executed by the system controller 40. First, the relationship between the tank temperature (the temperature of hydrogen in the fuel tank 10) and the heat-resistance temperature of the fuel cell stack 1 will be described.

In filling the fuel tank 10 with hydrogen, since the hydrogen is adiabatically compressed, the tank temperature increases. In particular, after the fuel tank 10 is rapidly filled with hydrogen, the tank temperature tends to excessively increase. Therefore, the temperature of hydrogen supplied to the fuel electrode 2 may exceed the upper heat-resistance temperature limit of a component constituting the fuel cell stack 1.

In contrast, in the case where hydrogen is consumed in accordance with the amount of power generation of the fuel cell stack 1, and hydrogen is released from the fuel tank 10, since the hydrogen is adiabatically expanded, the tank temperature decreases. In the case where the fuel cell system is left to stand for a long time in the atmosphere, the tank temperature approaches the outside air temperature. Therefore, when the fuel cell system is left to stand for a long time under a low-temperature environment, the operation of the system is then started, and a high-load operation is continued, the tank temperature tends to excessively decrease. In this case, the temperature of hydrogen supplied to the fuel electrode 2 may be lower than the lower heat-resistance temperature limit of a component constituting the fuel cell stack 1.

In this manner, in the case where the tank temperature is higher than the upper heat-resistance temperature limit, the fuel gas, such as hydrogen, that is supplied from the fuel tank 10 is cooled to a temperature equal to or lower than the upper heat-resistance temperature limit before being supplied to the fuel electrode 2. On the other hand, in the case where the tank temperature is lower than the lower heat-resistance temperature limit, the fuel gas that is supplied from the fuel tank 10 is heated to a temperature equal to or higher than the lower heat-resistance temperature limit before being supplied to the fuel electrode 2.

In this embodiment, by mixing the source hydrogen supplied from the fuel tank 10 with the circulating gas from the circulating pump 12, the temperature of the source/recirculated hydrogen mixture, i.e., the temperature of the gas at the inlet of the fuel electrode 2, is controlled. The temperature of the source/recirculated hydrogen mixture is determined by the condition under which the energy of a gas flowing into a junction at which the hydrogen-supply flow path L1 and the hydrogen-circulating flow path L2 are connected to each other is equal to the energy of the gas flowing out of the junction. Here, the energy of the gas is the total sum of enthalpy and kinetic energy. However, in the operation range (including the temperature range, the pressure range and the flow rate range) of the fuel cell system assumed in this embodiment, the amount of change in the kinetic energy is sufficiently smaller than the amount of change in enthalpy between the inflow and the outflow of the gas at the junction. Accordingly, in this embodiment, the amount of change in the kinetic energy is considered to be negligible. That is, the temperature of the source/recirculated hydrogen mixture is determined by the condition under which the enthalpy of a gas flowing into a junction is equal to the enthalpy of the gas flowing out of the junction. In this case, the relationship described in below Equation 1 is satisfied.

$$Cps \times Ts \times Qs + Cpr \times Tr \times Qr = Cpm \times Tm \times (Qs + Qr) \quad (1)$$

In Equation 1, Cps represents the specific heat at constant pressure of the source hydrogen at the inlet of the junction, Ts represents the temperature of the source hydrogen at the inlet of the junction, and Qs represents the flow rate of the source hydrogen at the inlet of the junction. Cpr represents the specific heat at constant pressure of the circulating gas at the inlet of the junction, Tr represents the temperature of the circulating gas at the inlet of the junction, and Qr represents the flow rate of the circulating gas at the inlet of the junction. Cpm represents the specific heat at constant pressure of a gas obtained after the source hydrogen is mixed with the circulating gas, i.e., the source/recirculated hydrogen mixture, and Tm is the temperature of the source/recirculated hydrogen mixture.

In the fuel cell system assumed in this embodiment, the operating temperature range is in the range of minus several tens of degrees Celsius to several tens of degrees Celsius, the operating pressure is in the range of several tens of kPa to several hundreds of kPa, and both the source hydrogen and the circulating gas are composed of diatomic molecules. Accordingly, each of the specific heats at constant pressure Cps, Cpr, and Cpm can be handled as a constant value (e.g., 3.5).

Furthermore, in this embodiment, the operating hydrogen pressure in the fuel electrode 2 is controlled to be constant in accordance with the extraction current extracted from the fuel cell stack 1. Therefore, the flow rate Qs of the source hydrogen corresponds to the flow rate of hydrogen consumed by power generation of the fuel cell stack 1. Accordingly, the flow rate Qs of the source hydrogen is proportional to the extraction current extracted from the fuel cell stack 1, and thus can be estimated in accordance with the extraction current extracted from the fuel cell stack 1.

In addition, a required hydrogen circulation ratio required for power generation of the fuel cell stack 1, namely, a value calculated by dividing the flow rate of hydrogen in the circulating gas (hereinafter referred to as "circulating hydrogen flow rate") by the flow rate Qs of the source hydrogen can be determined in advance in accordance with the extraction current extracted from the fuel cell stack 1. Therefore, a value obtained by dividing the circulating hydrogen flow rate by the hydrogen concentration contained in the circulating gas can be used as the flow rate Qr of the circulating gas. Here, the flow rate Qr of the circulating gas is proportional to the product of the extraction current extracted from the fuel cell stack 1 and the required hydrogen circulation ratio, and thus can be estimated in accordance with the extraction current extracted from the fuel cell stack 1.

Here, the flow rate of the circulating gas discharged from the purge valve 13 is considered to be significantly smaller than the flow rate Qs of the source hydrogen or the flow rate Qr of the circulating gas. Accordingly, there is no problem even if this flow rate of the circulating gas discharged from the purge valve 13 is ignored. Furthermore, since the temperature change in the source hydrogen is small between that at the fuel tank 10 and that at the inlet of the junction, the tank temperature can be used as the temperature Ts of the source hydrogen at the inlet of the junction. In other words, the tank-temperature sensor 14 functions as a gas temperature-detecting unit that detects the temperature of the source hydrogen flowing into the junction. In addition, heat exchange between the cooling water and hydrogen in the fuel electrode 2 is performed in the fuel cell stack 1 as described above, and thus the temperature Tr of the circulating gas at the inlet of the junction corresponds to the inlet cooling water temperature.

On the basis of the above-described concepts, the system controller 40 first estimates the flow rate Qs of the source hydrogen and the flow rate Qr of the circulating gas on the basis of the extraction current extracted from the fuel cell stack 1. The system controller 40 then determines a target value of the inlet cooling water temperature (target inlet cooling water temperature) on the basis of Equation 1 using the inlet cooling water temperature as a control parameter such that the temperature Tm of the source/recirculated hydrogen mixture becomes a target value. The system controller 40 controls, for example, the temperature of the cooling water on the basis of the target inlet cooling water temperature. Accordingly, in the fuel cell stack 1, heat exchange is performed between the cooling water and hydrogen, and thus the temperature of the circulating gas can be close to the target inlet cooling water temperature. The circulating gas whose temperature has been adjusted is mixed with the source hydrogen. Consequently, the temperature Tm of the gas (source/recirculated hydrogen mixture) at the inlet of the fuel electrode 2 is controlled within a managed temperature range determined in accordance with characteristics of the fuel cell, that is, the range from the lower heat-resistance temperature limit to the upper heat-resistance temperature limit.

On the basis of the above concept of control, the system controller 40 includes a flag calculation unit 41 (refer to FIG. 2), a cooling water temperature calculation unit 42 (refer to FIG. 3) and a cooling water flow rate calculation unit 43 (refer to FIG. 4) for performing the functions of the system controller 40.

Figure 2:
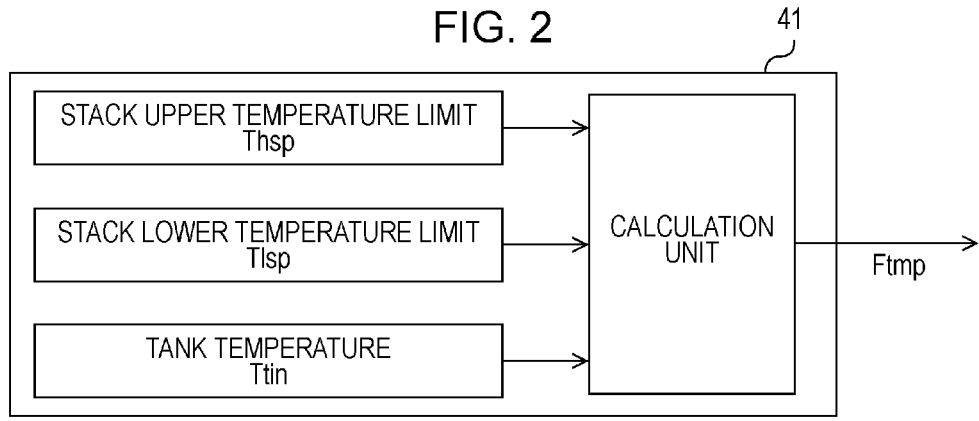
FIG. 2 is a block diagram showing a flag calculation unit.

FIG. 2 is a block diagram showing the flag calculation unit 41. The flag calculation unit 41 sets a temperature-discriminating flag Ftmp on the basis of a stack upper temperature limit Thsp, a stack lower temperature limit Tlsp and a tank temperature Ttin. This temperature-discriminating flag Ftmp is a flag that indicates whether the temperature in the tank is within a control temperature range specified as a range from the stack lower temperature limit Tlsp to the stack upper temperature limit Thsp, is higher than the control temperature range, or is lower than the control temperature range. In response, any one of three types of numbers, i.e., "0" to "2", is set. The determined temperature-discriminating flag Ftmp is output to the cooling water temperature calculation unit 42 and the cooling water flow rate calculation unit 43.

Herein, the stack upper temperature limit Thsp is a temperature for which there is a margin between itself and the upper heat-resistance temperature limit of a component constituting the fuel cell stack 1 (a temperature equal to or lower than the upper heat-resistance temperature limit). The stack lower temperature limit Tlsp is a temperature for which there is a margin between itself and the lower heat-resistance temperature limit of a component constituting the fuel cell stack 1 (a temperature equal to or higher than the lower heat-resistance temperature limit). The optimum values of the stack upper temperature limit Thsp and the stack lower temperature limit Tlsp are set in advance on the basis of experiments and simulations in consideration of the control accuracy, calculation processing errors and accuracies of various types of sensors. The tank temperature Ttin is the temperature of hydrogen stored in the fuel tank 10 and is read from the tank-temperature sensor 14.

Figure 3:
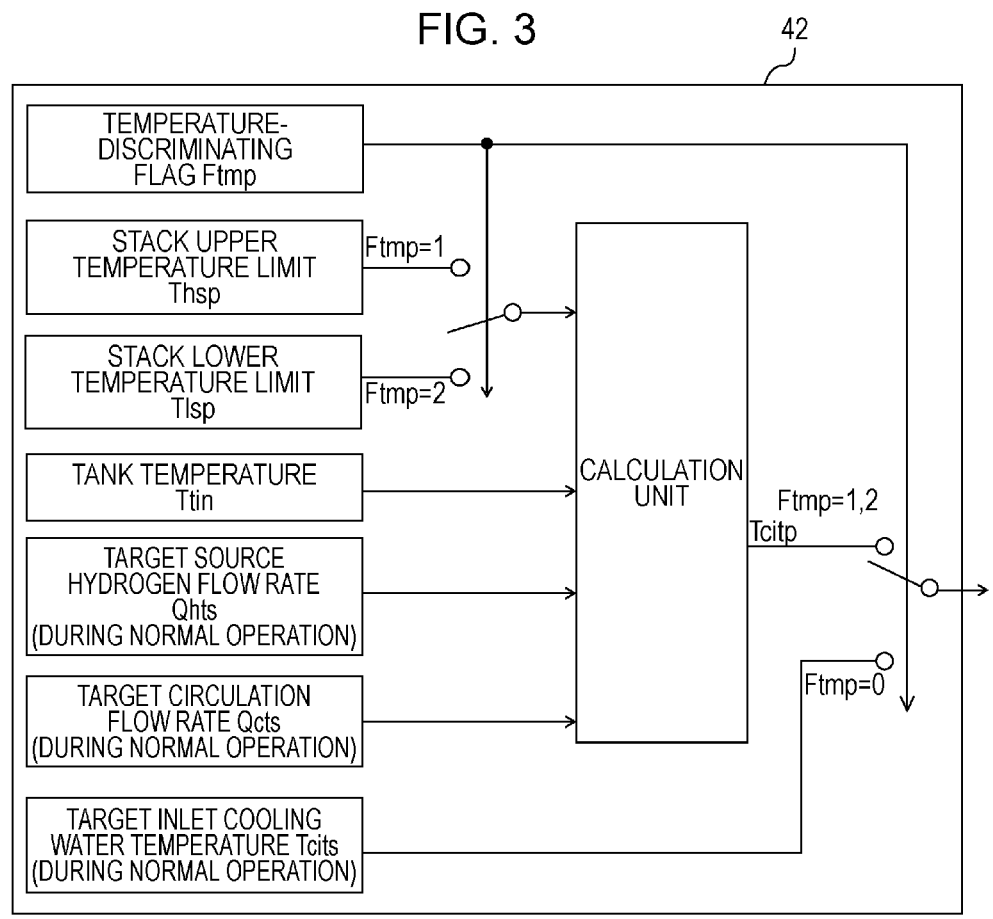
FIG. 3 is a block diagram showing a cooling water temperature calculation unit.

FIG. 3 is a block diagram showing the cooling water temperature calculation unit 42. The cooling water temperature calculation unit 42 determines a target value of cooling water temperature at the inlet of the fuel cell stack 1 (hereinafter referred to as "target inlet cooling water temperature").

Specifically, the cooling water temperature calculation unit 42 calculates a target inlet cooling water temperature Tcitp for stack protection on the basis of the temperature-discriminating flag Ftmp, the stack upper temperature limit Thsp, the stack lower temperature limit Tlsp, the tank temperature Ttin, a target source hydrogen flow rate Qhts and a target circulation flow rate Qcts. This target inlet cooling water temperature Tcitp for stack protection is a control target value of the inlet cooling water temperature derived from the viewpoint that the temperature of the source/recirculated hydrogen mixture is not outside of the heat-resistance temperature range of the fuel cell stack 1 depending on the temperature state of the source hydrogen. As in the flag calculation unit 41, the stack upper temperature limit Thsp and the stack lower temperature limit Tlsp are set in advance, and the tank temperature Ttin is read from the tank-temperature sensor 14. The temperature-discriminating flag Ftmp is input from the flag calculation unit 41. The target source hydrogen flow rate Qhts is a target value of the flow rate of the source hydrogen supplied to the fuel cell stack 1 during normal operation of the fuel cell stack 1 and is exclusively determined on the basis of the extraction current extracted from the fuel cell stack 1 in this embodiment. The target circulation flow rate Qcts is a target value of the flow rate of the circulating gas during normal operation of the fuel cell stack 1 and is exclusively determined on the basis of the extraction current extracted from the fuel cell stack 1 in this embodiment.

The cooling water temperature calculation unit 42 selects either the target inlet cooling water temperature Tcitp for stack protection or a target inlet cooling water temperature Tcits during normal operation on the basis of the temperature-discriminating flag Ftmp as a final target inlet cooling water temperature, which is used as a control instruction value. Here, the target inlet cooling water temperature Tcits during normal operation is a value determined in accordance with a control target value of the operating temperature of the fuel cell stack 1. For example, the value of the target inlet cooling water temperature Tcits during normal operation is determined such that the outlet cooling water temperature corresponds to the control target value by feedback control.

Figure 4:
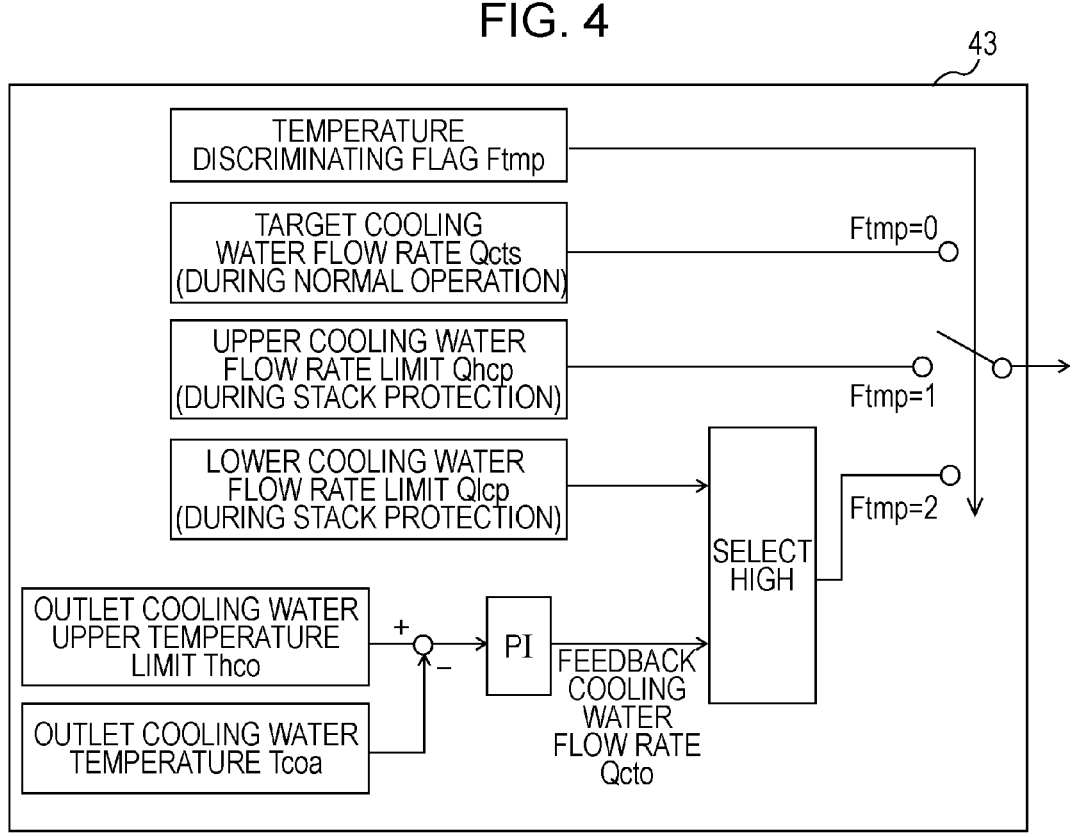
FIG. 4 is a block diagram showing a cooling water flow rate calculation unit.

FIG. 4 is a block diagram showing the cooling water flow rate calculation unit 43. The cooling water flow rate calculation unit 43 determines a target cooling water flow rate, which is a target value for the flow rate of the cooling water in the cooling system. More specifically, the cooling water flow rate calculation unit 43 selects any one of the target cooling water flow rate Qcts during normal operation, an upper cooling water flow rate limit Qhcp and a feedback cooling water flow rate Qcto as a target cooling water flow rate on the basis of the temperature-discriminating flag Ftmp.

Figure 5:
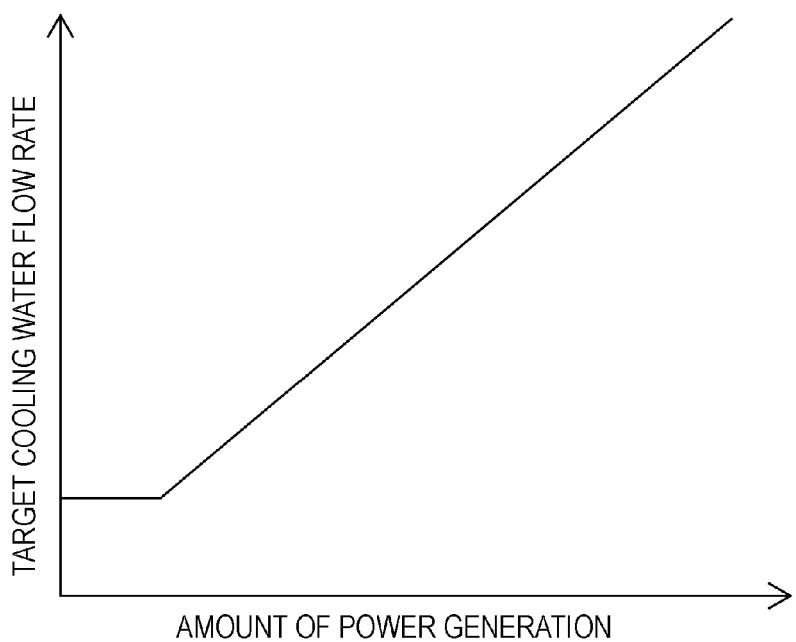
FIG. 5 is a graph showing the relationship between the cooling water flow rate and the amount of power generation.

Here, the target cooling water flow rate Qcts during normal operation is a target value of the flow rate of the cooling water of the fuel cell stack 1 during normal operation and is determined in accordance with the amount of power generation of the fuel cell stack 1, as shown in FIG. 5 by example. The upper cooling water flow rate limit Qhcp is the upper limit of the cooling water flow rate at which the cooling water can be circulated in the cooling system and is set in advance on the basis of, for example, characteristics of the cooling water-circulating pump 30. The feedback cooling water flow rate Qcto is a target flow rate of the cooling water in the case where feedback control is performed such that an outlet cooling water temperature Tcoa corresponds to an outlet cooling water upper temperature limit Thco. This outlet cooling water upper temperature limit Thco is a temperature for which there is a margin between itself and the upper heat-resistance temperature limit of a component constituting the fuel cell stack 1 (a temperature equal to or lower than the upper heat-resistance temperature limit). In this embodiment, the outlet cooling water upper temperature limit Thco is set to the same value as the stack upper temperature limit Thsp.

Figure 6:
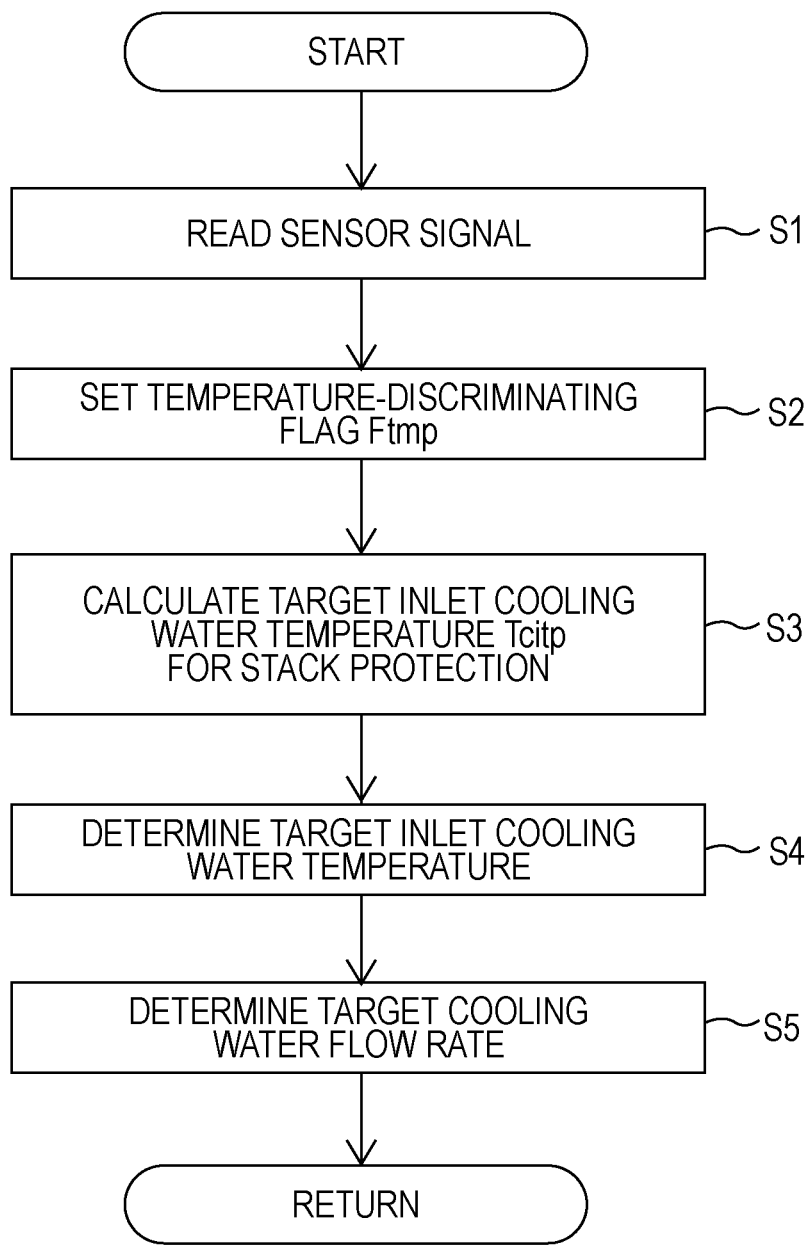
FIG. 6 is a flowchart showing a temperature control process of a source/recirculated hydrogen mixture used as a method of controlling a fuel cell system according to a first embodiment.

FIG. 6 is a flowchart showing a temperature control process of the source/recirculated hydrogen mixture used as a method of controlling a fuel cell system according to the first embodiment. The process shown in this flowchart is invoked at a predetermined cycle and is executed by the system controller 40. First, in step S1 various types of sensor signals are read.

In step S2, the flag calculation unit 41 sets the temperature-discriminating flag Ftmp. Specifically, the flag calculation unit 41 refers to the tank temperature Ttin read in step S1 and compares the tank temperature Ttin with the stack upper temperature limit Thsp and the stack lower temperature limit Tlsp, which are preset values. In the case where the tank temperature Ttin is higher than the stack upper temperature limit Thsp, the flag calculation unit 41 sets the temperature-discriminating flag Ftmp to be "1". In the case where the tank temperature Ttin is lower than the stack lower temperature limit Tlsp, the flag calculation unit 41 sets the temperature-discriminating flag Ftmp to be "2". In the case where the tank temperature Ttin is equal to or higher than the stack lower temperature limit Tlsp and equal to or lower than the stack upper temperature limit Thsp, the flag calculation unit 41 sets the temperature-discriminating flag Ftmp to be "0".

In step S3, the cooling water temperature calculation unit 42 calculates the target inlet cooling water temperature Tcitp for stack protection. More specifically, the cooling water temperature calculation unit 42 first refers to the temperature-discriminating flag Ftmp set in step S2. In the case where the temperature-discriminating flag Ftmp is "1", the cooling water temperature calculation unit 42 uses the stack upper temperature limit Thsp as a calculation parameter. In the case where the temperature-discriminating flag Ftmp is "2", the cooling water temperature calculation unit 42 uses the stack lower temperature limit Tlsp as a calculation parameter. In addition, the cooling water temperature calculation unit 42 uses the tank temperature Ttin read in step S1, the target source hydrogen flow rate Qhts and the target circulation flow rate Qcts as calculation parameters. The cooling water temperature calculation unit 42 then calculates the target inlet cooling water temperature Tcitp for stack protection using these calculation parameters on the basis of Equation 2 where Ftmp=1, and Equation 3 where Ftmp=2.

$$Tcitp = \{Cpm \times Thsp \times (Qhts+Qcts) - Cps \times Ttin \times Qhts\} / (Cpr \times Qcts) \quad (2)$$

$$Tcitp = \{Cpm \times Tlsp \times (Qhts+Qcts) - Cps \times Ttin \times Qhts\} / (Cpr \times Qcts) \quad (3)$$

Note that in the case where the temperature-discriminating flag Ftmp set in step S2 is "0", the cooling water temperature calculation unit 42 does not perform the above-described calculation, and the process skips to step S4.

In step S4, the cooling water temperature calculation unit 42 determines a final target inlet cooling water temperature. More specifically, the cooling water temperature calculation unit 42 refers to the temperature-discriminating flag Ftmp set in step S2. Subsequently, in the case where the temperature-discriminating flag Ftmp is "1" or "2", the cooling water temperature calculation unit 42 selects the target inlet cooling water temperature Tcitp for stack protection calculated in step S3 as the target inlet cooling water temperature. In the case where the temperature-discriminating flag Ftmp is "0", the cooling water temperature calculation unit 42 selects the target inlet cooling water temperature Tcits during normal operation as the target inlet cooling water temperature.

In step S5, the cooling water flow rate calculation unit 43 refers to the temperature-discriminating flag Ftmp set in step S2 and determines the target cooling water flow rate. More specifically, in the case where the temperature-discriminating flag Ftmp is set to be "0", the cooling water flow rate calculation unit 43 selects the target cooling water flow rate Qcts during normal operation as the target cooling water flow rate. In the case where the temperature-discriminating flag Ftmp is set to be "1", the cooling water flow rate calculation unit 43 selects the upper cooling water flow rate limit Qhcp as the target cooling water flow rate. In the case where the temperature-discriminating flag Ftmp is set to be "2", the cooling water flow rate calculation unit 43 selects the feedback cooling water flow rate Qcto as the target cooling water flow rate. When the cooling water flow rate becomes zero, the outlet cooling water temperature Tcoa cannot be detected using the outlet-cooling-water-temperature sensor 34. Therefore, even in the case where the temperature-discriminating flag Ftmp is set to be "2" the minimum value of the target cooling water flow rate is limited to a lower cooling water flow rate limit Qlcp.

As described above, according to this embodiment, the source hydrogen is supplied from the fuel tank 10 to the fuel cell stack 1, the gas discharged from the fuel cell stack 1 is mixed with the source hydrogen, and the gas mixture is circulated in the fuel cell stack. In addition, by means of the temperature control unit including the cooling water-circulating pump 30, the radiator 31 and the fan 32, the cooling water is circulated between the fuel cell stack 1 and the temperature control unit, and the temperature of the cooling water is adjusted. Thereby, the temperature of the fuel cell stack can be controlled. The fuel cell stack 1 includes the heat exchange unit 4 that performs heat exchange between the cooling water and the gas mixture containing the source hydrogen and the circulating gas. In addition, the system controller 40 controls the temperature control unit on the basis of the temperature of the source hydrogen flowing into the junction at which the source hydrogen and the circulating gas are mixed (i.e., tank temperature) Ttin. Thus, the system controller 40 adjusts the temperature of the cooling water such that the temperature of the source/recirculated hydrogen mixture that is mixed at the junction and then supplied to the fuel cell stack 1 is kept within a managed temperature range.

According to the above structure, by controlling the temperature of the cooling water and performing heat exchange between the cooling water and hydrogen in the fuel cell stack 1, the temperature of the circulating gas is adjusted. Then by mixing the circulating gas with the source hydrogen, the source/recirculated hydrogen mixture can be heated or cooled such that the temperature of the source/recirculated hydrogen mixture is kept within a managed temperature range. Accordingly, the temperature of the gas supplied to the fuel cell stack 1 can be controlled to suppress the degradation of the power generation performance.

According to this embodiment, the managed temperature range is set in the range from the lower heat-resistance temperature limit to the upper heat-resistance temperature limit in the fuel cell stack 1. Accordingly, by controlling the temperature of the gas within this range, the degradation of the power generation performance, breaking of the fuel cell stack 1 and the like can be suppressed.

According to this embodiment, the system controller 40 adjusts the temperature of the cooling water in the case where the tank temperature Ttin is outside of a control temperature range that is set on the basis of a managed temperature range. The temperature of the source/recirculated hydrogen mixture tends to be affected by the tank temperature Ttin. Therefore, by comparing the tank temperature Ttin with the control temperature range, the temperature of the gas supplied to the fuel cell stack 1 can be controlled, thus suppressing the degradation of the power generation performance.

According to this embodiment, the system controller 40 adjusts the temperature of the cooling water and, in addition, adjusts the flow rate of the cooling water such that the temperature of the source/recirculated hydrogen mixture is kept within the managed temperature range. According to this structure, by adjusting the flow rate of the cooling water supplied to the fuel cell stack 1, the temperature difference between the inlet and the outlet of the fuel cell stack 1 can be adjusted. Accordingly, the average temperature of the cooling water in the fuel cell stack can be adjusted, and thus the circulating gas can be cooled efficiently.

According to this embodiment, in the case where the temperature of the cooling water reaches an allowable upper temperature limit in a situation where the temperature of the cooling water is increased, the system controller 40 increases the flow rate of the cooling water while maintaining the temperature of the cooling water at the allowable upper temperature limit. According to this structure, the temperature difference between the inlet and the outlet of the fuel cell stack 1 is decreased, thus increasing the average temperature of the cooling water in the fuel cell stack 1. Therefore, heat exchange between the cooling water and the circulating gas in the fuel cell stack 1 increases, and thus the circulating gas can be heated efficiently.

In addition, according to this embodiment, the heat exchange unit 4 of the fuel cell stack 1 performs heat exchange between the outlet side of the gas in the fuel cell stack 1 and the inlet side of the cooling water in the fuel cell stack 1. According to this structure, hydrogen and the cooling water forms an opposing flow (counter-flow), and thus the source hydrogen can be cooled efficiently.

In the above-described embodiment, the heat exchange unit 4 of the fuel cell stack 1 performs heat exchange between the outlet side of the gas in the fuel cell stack 1 and the inlet side of the cooling water in the fuel cell stack 1. Alternatively, the heat exchange may be performed between the outlet side of the gas in the fuel cell stack 1 and the outlet side of the cooling water in the fuel cell stack 1. According to this structure, hydrogen and the cooling water forms a parallel flow (co-flow), and thus the source hydrogen can be heated efficiently. Therefore, regarding a characteristic of the fuel cell stack 1, in the case where it is necessary to take measures for the upper heat-resistance temperature limit, the heat exchange unit 4 preferably has a structure that forms a counter-flow, whereas in the case where it is necessary to take measures for the lower heat-resistance temperature limit, the heat exchange unit 4 preferably has a structure that forms a co-flow.

Furthermore, in the case where the source hydrogen at a low temperature is heated using a circulating gas at a high temperature, the circulating gas serves as a substance to be cooled. Accordingly, condensed water may be generated. Therefore, a gas-liquid separator is preferably provided in a flow path ranging from the junction to the inlet of the fuel electrode 2. Note that in the case where condensed water is generated, latent heat of condensation is generated, and thus the effect of the latent heat of condensation may be added to Equation 1 described above.

Figure 7:
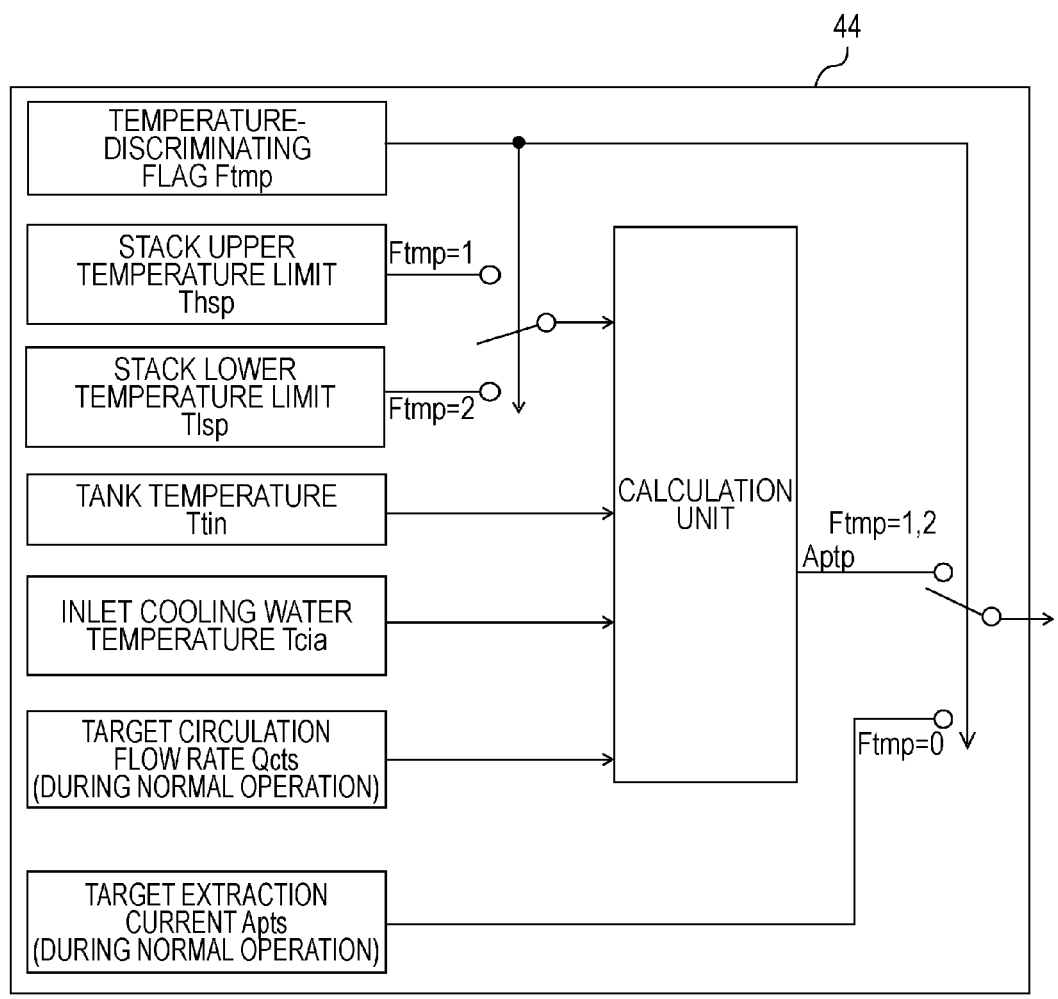
FIG. 7 is a block diagram showing an extraction current calculation unit according to a second embodiment.

FIG. 7 is a block diagram showing an extraction current calculation unit 44 according to a second embodiment of the invention. A fuel cell system of the second embodiment differs from that of the first embodiment in that the extraction current calculation unit 44 is added as a functional element of the system controller 40. A description of the structure common to the first embodiment is omitted, and points of difference will be described below.

In addition to the flag calculation unit 41, the cooling water temperature calculation unit 42, and the cooling water flow rate calculation unit 43, the system controller 40 further includes the extraction current calculation unit 44 for performing the functions of the system controller 40. The temperature-discriminating flag Ftmp set in the flag calculation unit 41 is also output to the extraction current calculation unit 44.

The extraction current calculation unit 44 determines a target value of a current extracted from the fuel cell stack 1 (hereinafter referred to as "target extraction current").

Specifically, the extraction current calculation unit 44 calculates an extraction current limitation value Aptp for stack protection on the basis of the temperature-discriminating flag Ftmp, the stack upper temperature limit Thsp, the stack lower temperature limit Tlsp, the tank temperature Ttin, an inlet cooling water temperature Tcia and the target circulation flow rate Qcts. The extraction current limitation value Aptp for stack protection is a limitation value of the extraction current derived from the viewpoint that the temperature of the source/recirculated hydrogen mixture is not outside of the heat-resistance temperature range of the fuel cell stack 1 depending on the temperature state of the source hydrogen. Here, as in the flag calculation unit 41, the stack upper temperature limit Thsp and the stack lower temperature limit Tlsp are set in advance, and the tank temperature Ttin is read from the tank-temperature sensor 14. The temperature-discriminating flag Ftmp is input from the flag calculation unit 41, and the inlet cooling water temperature Tcia is read from the inlet-cooling-water-temperature sensor 33. The target circulation flow rate Qcts is a target value of the flow rate of the circulating gas during normal operation of the fuel cell stack 1 and is exclusively determined on the basis of the extraction current extracted from the fuel cell stack 1 in this embodiment.

The extraction current calculation unit 44 selects either the extraction current limitation value Aptp for stack protection or a target extraction current Apts during normal operation on the basis of the temperature-discriminating flag Ftmp as a final target extraction current, which is used as a control instruction value. Here, the target extraction current Apts during normal operation is exclusively determined in accordance with a required electric power required for the system.

Figure 8:
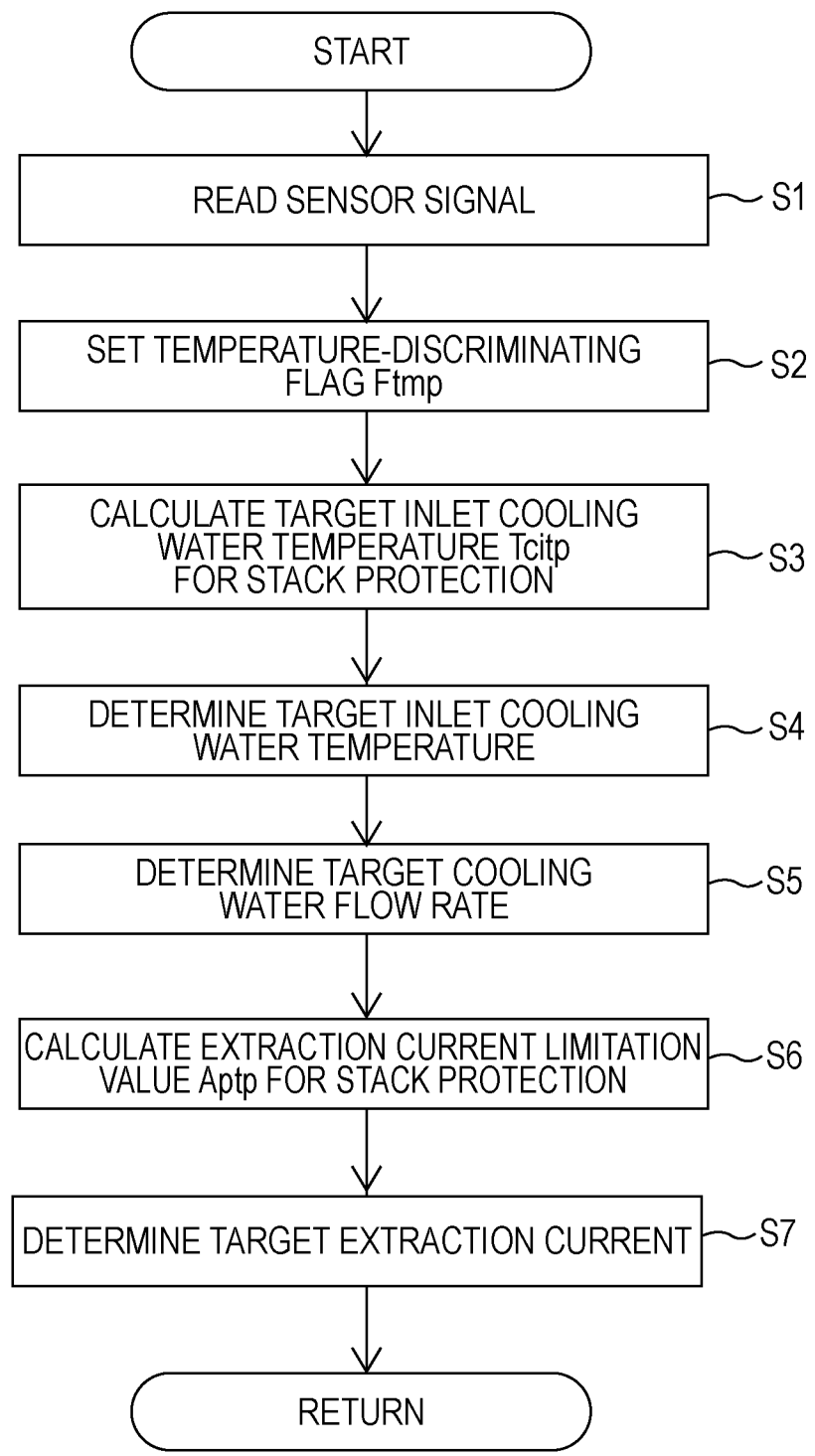
FIG. 8 is a flowchart showing a temperature control process of a source/recirculated hydrogen mixture used as a method of controlling a fuel cell system according to the second embodiment.

FIG. 8 is a flowchart showing a procedure of a temperature control process of the source/recirculated hydrogen mixture used as a method of controlling a fuel cell system according to the second embodiment. The process shown in this flowchart is invoked at a predetermined cycle and is executed by the system controller 40. The process performed in step S1 to step S5 is the same as the first embodiment.

After step S5, the process proceeds to step S6, where the extraction current calculation unit 44 calculates the extraction current limitation value Aptp for stack protection. More specifically, the extraction current calculation unit 44 first refers to the temperature-discriminating flag Ftmp set in step S2. In the case where the temperature-discriminating flag Ftmp is "1", the extraction current calculation unit 44 uses the stack upper temperature limit Thsp as a calculation parameter. In the case where the temperature-discriminating flag Ftmp is "2", the extraction current calculation unit 44 uses the stack lower temperature limit Tlsp as a calculation parameter. In addition, the extraction current calculation unit 44 uses the tank temperature Ttin read in step S1, the inlet cooling water temperature Tcia and the target circulation flow rate Qcts as calculation parameters. The extraction current calculation unit 44 calculates a flow rate limitation value Qhl of the source hydrogen using these calculation parameters on the basis of Equation 4 where Ftmp=1, and Equation 5 where Ftmp=2.

$$Qhl=\{(Cpm \times Thsp \times Qcts - Cpr \times Tcia \times Qcts)/(Cps \times Ttin - Cpm \times Thsp)\} \quad (4)$$

$$Qhl=\{(Cpm \times Tlsp \times Qcts - Cpr \times Tcia \times Qcts)/(Cps \times Ttin - Cpm \times Tlsp)\} \quad (5)$$

Next, on the basis of the flow rate limitation value Qhl of the source hydrogen, the extraction current calculation unit 44 calculates an extraction current corresponding to this flow rate as the extraction current limitation value Aptp for stack protection.

In step S7, the extraction current calculation unit 44 determines a final target extraction current. More specifically, the extraction current calculation unit 44 refers to the temperature-discriminating flag Ftmp set in step S2. In the case where the temperature-discriminating flag Ftmp is "1" or "2", the extraction current calculation unit 44 selects the extraction current limitation value Aptp for stack protection calculated in step S6 as the target extraction current. In the case where the temperature-discriminating flag Ftmp is "0", the extraction current calculation unit 44 selects the target extraction current Apts during normal operation as the target extraction current.

As described above, in this embodiment, the system controller 40 adjusts the flow rate of the source hydrogen on the basis of the temperature of the cooling water such that the temperature of the source/recirculated hydrogen mixture is kept within a managed temperature range. According to this structure, the temperature of the source/recirculated hydrogen mixture using the circulating gas can be easily adjusted. Thereby, the temperature of the gas supplied to the fuel cell stack 1 can be controlled, thus suppressing the degradation of the power generation performance.

In addition, according to this embodiment, in the case where the flow rate of the source hydrogen is decreased, the system controller 40 controls the electric power extraction device 5 to limit the electric power extracted from fuel cell stack 1. According to this structure, the flow rate of the source hydrogen flowing into the junction can be decreased while hydrogen required for the power generation of the fuel cell stack 1 is supplied in proper quantities. Therefore, the temperature of the gas supplied to the fuel cell stack 1 can be controlled without degrading the power generation performance of the fuel cell stack 1.

In this embodiment, in addition to the temperature control of the circulating gas using cooling water, by limiting the extraction current, that is, by controlling the flow rate of the source hydrogen, the temperature of the source/recirculated hydrogen mixture is adjusted. However, the additional control is not limited to the control of the flow rate of the source hydrogen.

Figure 9:
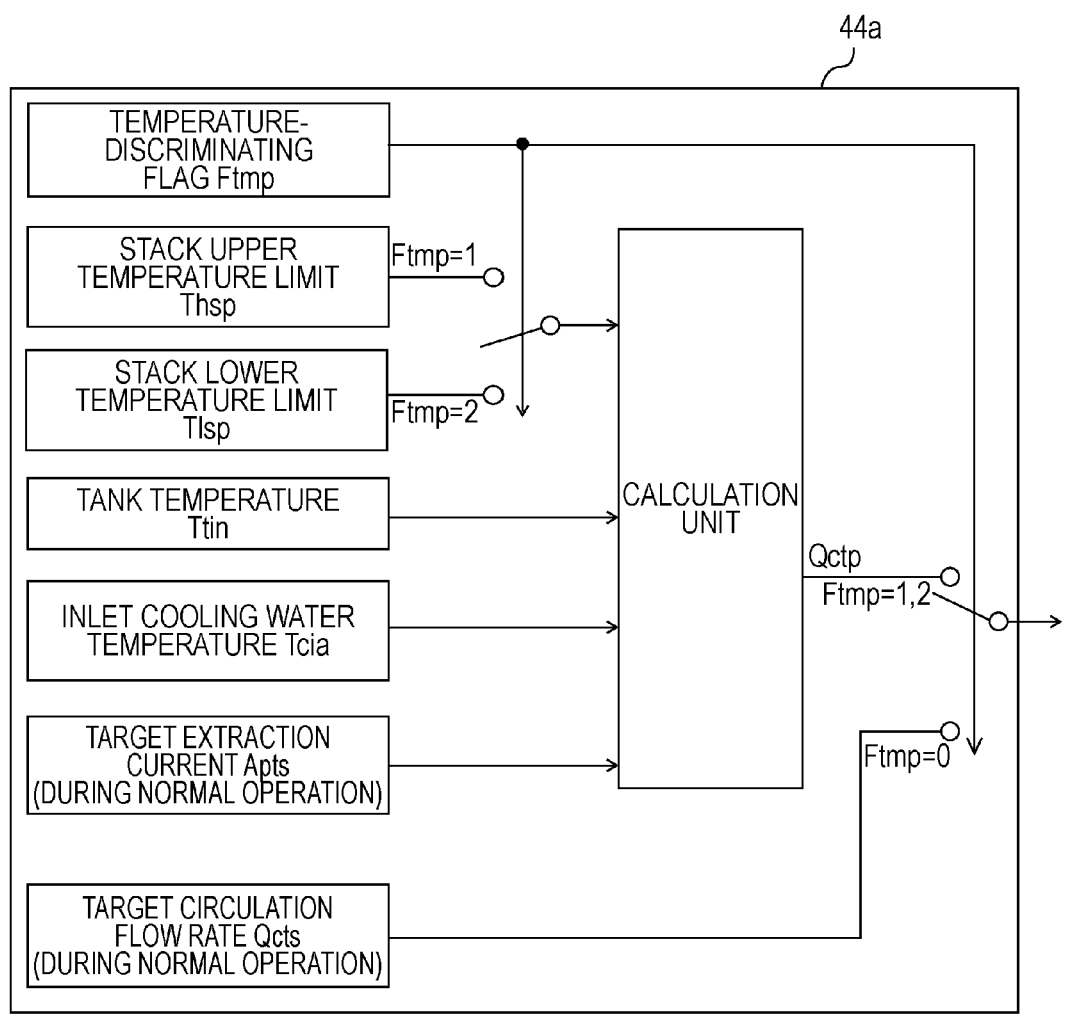
FIG. 9 is a block diagram showing a circulation flow rate calculation unit.

FIG. 9 is a block diagram showing a circulation flow rate calculation unit 44a, which is a modification of the second embodiment. More specifically, in addition to the flag calculation unit 41, the cooling water temperature calculation unit 42 and the cooling water flow rate calculation unit 43, the system controller 40 further includes the circulation flow rate calculation unit 44a for performing the functions of the system controller 40. The temperature-discriminating flag Ftmp set in the flag calculation unit 41 is also output to the circulation flow rate calculation unit 44a.

The circulation flow rate calculation unit 44a determines a target value of the flow rate of the circulating gas (hereinafter referred to as "target circulation flow rate").

Specifically, the circulation flow rate calculation unit 44a calculates a target circulation flow rate Qctp for stack protection on the basis of the temperature-discriminating flag Ftmp, the stack upper temperature limit Thsp, the stack lower temperature limit Tlsp, the tank temperature Ttin, the inlet cooling water temperature Tcia and the target extraction current Apts during normal operation. This target circulation flow rate Qctp for stack protection is a control target value of the flow rate of the circulating gas derived from the viewpoint that the temperature of the source/recirculated hydrogen mixture is not outside of the heat-resistance temperature range of the fuel cell stack 1 depending on the temperature state of the source hydrogen. As in the extraction current calculation unit 44, the stack upper temperature limit Thsp and the stack lower temperature limit Tlsp are set in advance, and the tank temperature Ttin is read from the tank-temperature sensor 14. The temperature-discriminating flag Ftmp is input from the flag calculation unit 41, and the inlet cooling water temperature Tcia is read from the inlet-cooling-water-temperature sensor 33. The target extraction current Apts during normal operation is exclusively determined in accordance with a required electric power required for the system.

The circulation flow rate calculation unit 44a selecta either the target circulation flow rate Qctp for stack protection or the target circulation flow rate Qcts during normal operation on the basis of the temperature-discriminating flag Ftmp as a final target circulation flow rate, which is used as a control instruction value. Here, the target circulation flow rate Qcts during normal operation is determined on the basis of the extraction current extracted from the fuel cell stack 1.

In the case where the circulation flow rate calculation unit 44a is used instead of the extraction current calculation unit 44, the process of step S6 and step S7 shown in FIG. 8 is changed to the process described below.

First, the circulation flow rate calculation unit 44a calculates the target circulation flow rate Qctp for stack protection. Specifically, the circulation flow rate calculation unit 44a first refers to the temperature-discriminating flag Ftmp set in step S2. In the case where the temperature-discriminating flag Ftmp is "1", the circulation flow rate calculation unit 44a uses the stack upper temperature limit Thsp as a calculation parameter. In the case where the temperature-discriminating flag Ftmp is "2", the circulation flow rate calculation unit 44a uses the stack lower temperature limit Tlsp as a calculation parameter. In addition, the circulation flow rate calculation unit 44a uses the tank temperature Ttin read in step S1, the inlet cooling water temperature Tcia and the target extraction current Apts during normal operation as calculation parameters. The circulation flow rate calculation unit 44a calculates the target circulation flow rate Qctp for stack protection using these calculation parameters on the basis of Equation 6 where Ftmp=1, and Equation 7 where Ftmp=2. In this case, the target source hydrogen flow rate Qhts is exclusively determined on the basis of the target extraction current Apts during normal operation.

$$Qctp=\{(Cpm \times Thsp \times Qhts - Cps \times Ttin \times Qhts)/(Cpr \times Ttin - Cpm \times Thsp)\} \quad (6)$$

$$Qctp=\{(Cpm \times Tlsp \times Qhts - Cps \times Ttin \times Qhts)/(Cpr \times Ttin - Cpm \times Tlsp)\} \quad (7)$$

The circulation flow rate calculation unit 44a then determines a final target circulation flow rate. Specifically, the circulation flow rate calculation unit 44a refers to the temperature-discriminating flag Ftmp set in step S2. In the case where the temperature-discriminating flag Ftmp is "1" or "2", the circulation flow rate calculation unit 44a selects the target circulation flow rate Qctp for stack protection as a target extraction current. In the case where the temperature-discriminating flag Ftmp is "0", the circulation flow rate calculation unit 44a selects the target circulation flow rate Qcts during normal operation as a target extraction current.

As described above, in the above modification, the system controller 40 further adjusts the flow rate of the circulating gas on the basis of the temperature of the cooling water such that the temperature of the source/recirculated hydrogen mixture is kept within a managed temperature range. According to this structure, the temperature of the source/recirculated hydrogen mixture can be easily adjusted using the circulating gas. Thereby, the temperature of the gas supplied to the fuel cell stack 1 can be controlled, thus suppressing the degradation of power generation performance.

In the above-described embodiment, the extraction current is limited from the standpoint of stack protection. However, the present invention is not limited thereto. Alternatively, the stack protection may be performed by controlling the pressure of hydrogen supplied to the fuel cell stack 1.

Figure 10:
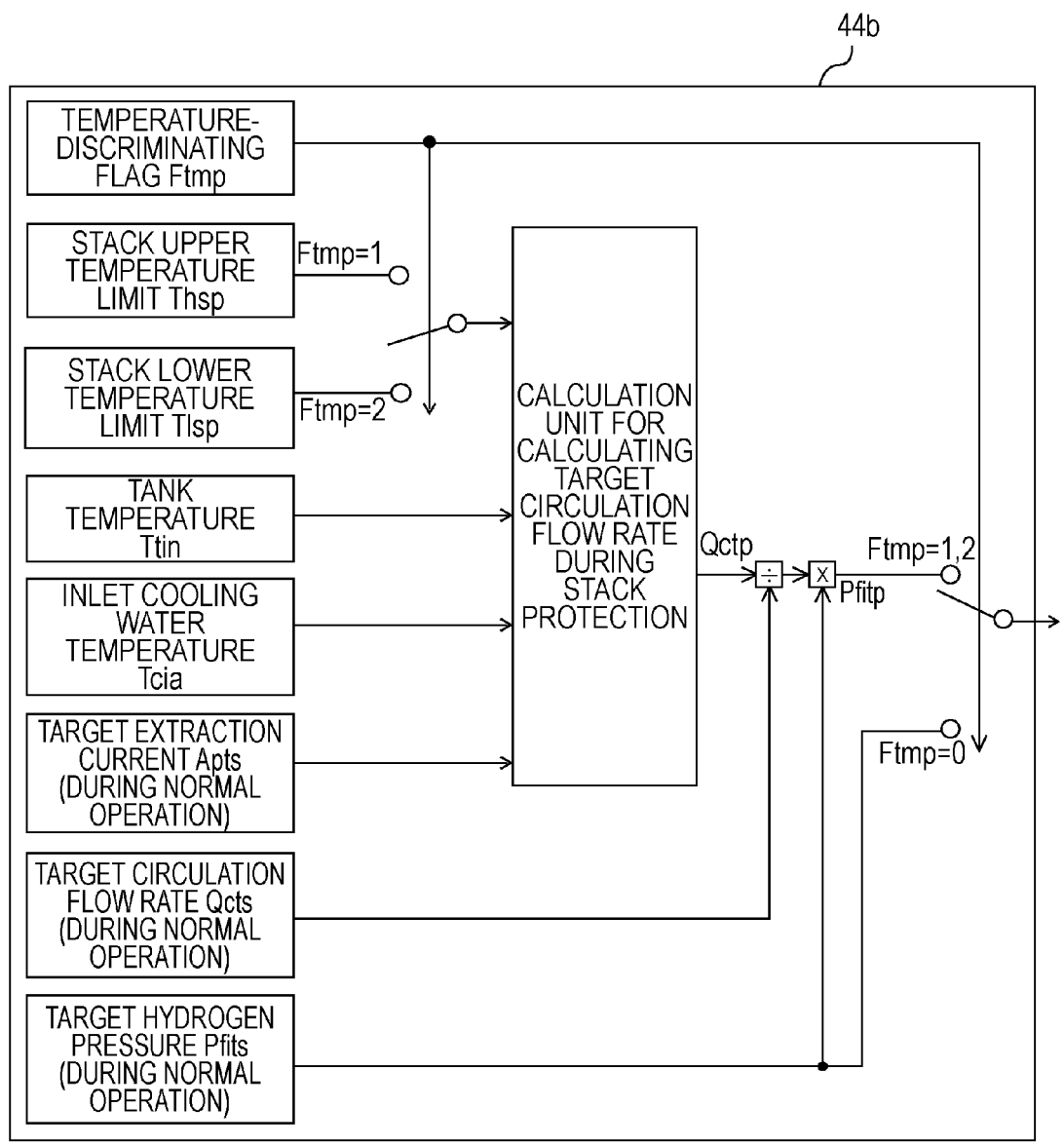
FIG. 10 is a block diagram showing a hydrogen pressure calculation unit.

FIG. 10 is a block diagram showing a hydrogen pressure calculation unit 44b, which is another modification of the second embodiment. Specifically, in addition to the flag calculation unit 41, the cooling water temperature calculation unit 42 and the cooling water flow rate calculation unit 43, the system controller 40 further includes the hydrogen pressure calculation unit 44b for performing the functions of the system controller 40. The temperature-discriminating flag Ftmp set in the flag calculation unit 41 is also output to the hydrogen pressure calculation unit 44b. A part of the structure of the hydrogen pressure calculation unit 44b is common to the structure of the above-described circulation flow rate calculation unit 44a. Therefore, overlapping description is omitted, and points of difference will be described.

The hydrogen pressure calculation unit 44b determines a target value of the pressure of hydrogen (source/recirculated hydrogen mixture) supplied to the fuel cell stack 1 (hereinafter referred to as "target hydrogen pressure").

Specifically, the hydrogen pressure calculation unit 44b calculates a target circulation flow rate Qctp for stack protection as in the above-described modification on the basis of the temperature-discriminating flag Ftmp, the stack upper temperature limit Thsp, the stack lower temperature limit Tlsp, the tank temperature Ttin, the inlet cooling water temperature Tcia and the target extraction current Apts during normal operation. In addition, the hydrogen pressure calculation unit 44b calculates a target hydrogen pressure Pfitp for stack protection on the basis of the target circulation flow rate Qctp for stack protection and the target circulation flow rate Qcts during normal operation. The target hydrogen pressure Pfitp for stack protection is a control target value of the hydrogen pressure derived from the viewpoint that the temperature of the source/recirculated hydrogen mixture is not outside of the heat-resistance temperature range of the fuel cell stack 1 depending on the temperature state of the source hydrogen.

The hydrogen pressure calculation unit 44b selects either the target hydrogen pressure Pfitp for stack protection or the target hydrogen pressure Pfits during normal operation on the basis of the temperature-discriminating flag Ftmp as a final target hydrogen pressure, which is used as a control instruction value. Here, the target hydrogen pressure Pfits during normal operation is determined on the basis of the extraction current extracted from the fuel cell stack 1.

In the case where the hydrogen pressure calculation unit 44b is used instead of the extraction current calculation unit 44, the process of step S6 and step S7 shown in FIG. 8 is changed to the process described below.

First, the hydrogen pressure calculation unit 44b calculates the target circulation flow rate Qctp for stack protection. Next, the hydrogen pressure calculation unit 44b divides the target circulation flow rate Qctp for stack protection by the target circulation flow rate Qcts during normal operation and multiples the divided value by the target hydrogen pressure Pfits during normal operation to calculate the target hydrogen pressure Pfitp for stack protection. This is because, in the case where the circulating pump 12 is a device that discharges the volume, by increasing the inlet pressure in the fuel electrode 2, i.e., by increasing the pressure of the circulating gas, the gas density can be increased and the mass flow rate discharged from the circulating pump 12 can be increased. In addition, in the case where the discharge performance of the circulating pump 12 improves as the density of the circulating gas increases, the mass flow rate discharged from the circulating pump 12 can be increased.

The hydrogen pressure calculation unit 44b then determines a final target hydrogen pressure. Specifically, the hydrogen pressure calculation unit 44b refers to the temperature-discriminating flag Ftmp set in step S2. In the case where the temperature-discriminating flag Ftmp is "1" or "2", the hydrogen pressure calculation unit 44b selects the target hydrogen pressure Pfitp for stack protection as a target extraction current. In the case where the temperature-discriminating flag Ftmp is "0", the hydrogen pressure calculation unit 44b selects the target hydrogen pressure Pfits during normal operation as a target extraction current.

As described in the above modification, the system controller 40 further adjusts the pressure of the source/recirculated hydrogen mixture on the basis of the temperature of the cooling water such that the temperature of the source/recirculated hydrogen mixture is kept within a managed temperature range. According to this structure, the temperature of the source/recirculated hydrogen mixture can be easily adjusted using the circulating gas. Thereby, the temperature of the gas supplied to the fuel cell stack 1 can be controlled, thus suppressing the degradation of power generation performance.

The above-described two modifications may be separately performed. Alternatively, the two modifications may be performed in parallel. For example, in this case, where the calculation result of the circulation flow rate calculation unit 44a reaches a limit value (the maximum discharge flow rate) of the discharge performance of the circulating pump 12, the maximum discharge flow rate may be input to the target circulation flow rate Qcts during normal operation in the hydrogen pressure calculation unit 44b, thus calculating the target hydrogen pressure. Alternatively, where the target hydrogen pressure reaches the maximum pressure that is acceptable by the fuel cell system, instead of the target circulation flow rate Qcts during normal operation in the extraction current calculation unit 44 of FIG. 7, a flow rate in which the amount of increase in the mass flow rate due to the maximum pressure may be input to the maximum discharge flow rate, thus calculating the target extraction current. As a result, a limitation for the extraction current extracted from the fuel cell system can be suppressed.

A fuel cell system according to a third embodiment differs from that of the second embodiment in that control of the opening of the purge valve 13 is added. More specifically, in the second embodiment, until the inlet cooling water temperature reaches a target value, the source/recirculated hydrogen mixture is kept in a managed temperature range by limiting the flow rate of a supply gas, by adjusting the flow rate of the circulating gas or by adjusting the operating pressure in the fuel electrode 2, all of which are performed by limiting the extraction current extracted from the fuel cell stack 1. In such a period, the hydrogen circulation flow rate is sufficiently ensured relative to a required hydrogen circulation flow rate of the fuel cell stack 1. Therefore, until the hydrogen circulation flow rate reaches the required hydrogen circulation flow rate, the system controller 40 can decrease the amount of nitrogen discharged from the purge valve 13. Consequently, the system controller 40 controls the opening of the purge valve 13 such that a value of the hydrogen circulation flow rate calculated by multiplying the value detected by the circulation-flow-rate sensor 18 by the value detected by the circulating-hydrogen-concentration sensor 17 is equal to the required hydrogen circulation flow rate, that is, the value of the hydrogen circulation flow rate is equal to or lower than the acceptable upper limit of the amount of impurities in the circulating gas. Accordingly, the amount of nitrogen present in the hydrogen-circulating flow path L2 can be increased to increase the density of the circulating gas.

In the embodiments described above, the fuel cell system has a structure in which an exhaust gas discharged from the fuel electrode 2 in the fuel cell stack 1 is circulated. Therefore, a description has been made of a method of controlling the gas temperature at the inlet of the fuel electrode 2 using the circulating gas at the fuel electrode 2 side. However, when the fuel cell system has a structure in which an exhaust gas discharged from the oxidizer electrode 3 in the fuel cell stack 1 is circulated, in the same way as in the above-described method, the gas temperature at the inlet of the oxidizer electrode 3 can be controlled using a circulating gas at the oxidizer electrode 3 side.

The above-described embodiments have been described in order to allow easy understanding of the invention and do not limit the invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A fuel cell system comprising:
   a fuel cell that generates electric power by electrochemically reacting a reactant gas mixture;
   a reactant gas supply unit configured to supply a reactant gas;
   a gas circulation unit configured to mix a circulating reactant gas from the fuel cell with the reactant gas to supply the reactant gas mixture to the fuel cell;
   a temperature control unit having a cooling flow path through the fuel cell, a circulating pump configured to circulate a heat transfer medium through the fuel cell, and a radiator on the cooling flow path to adjust the temperature of the heat transfer medium;
   a gas temperature-detecting unit configured to detect an inlet reactant gas mixture temperature of the reactant gas mixture before the reactant gas mixture enters the fuel cell;
   a heat exchange unit in the fuel cell through which an outlet side of the reactant gas mixture and an inlet side of the heat transfer medium flows, the heat exchange unit configured to perform heat exchange between the reactant gas mixture and a portion of the heat transfer medium; and a control unit programmed to:
determine a target inlet side temperature of the heat transfer medium based on a reactant gas supply unit temperature, a reactant gas flow rate, and a reactant gas mixture flow rate, the target inlet side temperature determined to maintain the inlet reactant gas mixture temperature within a predetermined range; and
adjust a temperature of the heat transfer medium to achieve the target inlet side temperature by controlling the temperature control unit.

2. The fuel cell system according to claim 1, wherein the predetermined temperature range is set in a range from a lower heat-resistance temperature limit of the fuel cell to an upper heat-resistance temperature limit of the fuel cell.

3. The fuel cell system according to claim 2, wherein the control unit adjusts the temperature of the heat transfer medium when the inlet reactant gas mixture temperature is outside of a control temperature range that is set on the basis of the predetermined temperature range and is within the predetermined temperature range.

4. The fuel cell system according to claim 3, wherein the control unit adjusts the temperature of the heat transfer medium and adjusts a flow rate of the heat transfer medium such that the temperature of the reactant gas mixture is kept within the predetermined temperature range.

5. The fuel cell system according to claim 1, wherein the control unit further adjusts a flow rate of the reactant gas on the basis of the temperature of the heat transfer medium such that the temperature of the gas mixture is kept within the predetermined temperature range.

6. The fuel cell system according to claim 5, further comprising:
an electric power extraction unit configured to extract electric power from the fuel cell,
wherein when flow rate of the reactant gas is decreased, the control unit controls the electric power extraction unit to limit the electric power extracted from the fuel cell when flow rate of the reactant gas is decreased.

7. The fuel cell system according to claim 5, further comprising:
a purge unit configured to discharge impurities contained in the circulating reactant gas,
wherein the control unit controls the purge unit to decrease an amount of impurities discharged from the purge unit.

8. The fuel cell system according to claim 7, wherein the control unit controls the purge unit such that the amount of impurities is equal to or lower than an acceptable upper limit of the amount of impurities in the circulating gas.

9. The fuel cell system according to claim 1, wherein the control unit further adjusts a flow rate of the circulating reactant gas on the basis of the temperature of the heat transfer medium such that the temperature of the reactant gas mixture is kept within the predetermined temperature range.

10. The fuel cell system according to claim 1, wherein the control unit further adjusts a pressure of the reactant gas mixture on the basis of the temperature of the heat transfer medium such that the temperature of the reactant gas mixture is kept within the predetermined temperature range.

11. The fuel cell system according to claim 1, wherein the reactant gas mixture and the heat transfer medium having opposing flows.

12. The fuel cell system according to claim 1, further comprising:

a moisturizer configured to add moisture to a compressed gas.

13. The fuel cell system according to claim 12, wherein the moisturizer is configured to receive a gas exiting the fuel cell.

14. The fuel cell system according to claim 1, further comprising:
a hydrogen concentration sensor.

15. The fuel cell system according to claim 1, further comprising:
an aftercooler configured to reduce the temperature of a compressed gas.

16. A method of controlling a fuel cell system comprising:
supplying a reactant gas using a reactant gas supply unit;
mixing a circulating gas discharged from a fuel cell with the reactant gas using a gas circulation unit to supply a reactant gas mixture to the fuel cell, the fuel cell generating electric power by electrochemically reacting a resultant reactant gas mixture;
circulating a heat transfer medium through the fuel cell using a temperature control unit having a cooling flow path, a circulating pump and a radiator on the cooling flow path;
detecting an inlet reactant gas mixture temperature of the reactant gas mixture before the reactant gas mixture enters the fuel cell using a gas temperature-detecting unit;
exchanging heat between the reactant gas mixture at an outlet of the fuel cell and a portion of the heat transfer medium at an inlet of the fuel cell in a heat exchange unit in the fuel cell;
determining a target inlet side temperature of the heat transfer medium based on a reactant gas supply unit temperature, a reactant gas flow rate, and a reactant gas mixture flow rate, the target inlet side temperature determined to maintain the inlet reactant gas mixture temperature within a predetermined range; and
adjusting a temperature of the heat transfer medium to achieve the target inlet side temperature by controlling the temperature of the heat transfer medium using the temperature control unit.

17. The method according to claim 16, wherein the predetermined temperature range is set in a range from a lower heat-resistance temperature limit of the fuel cell to an upper heat-resistance temperature limit of the fuel cell.

18. The method according to claim 16, further comprising:
increasing a flow rate of the heat transfer medium while maintaining the temperature of the heat transfer medium at an allowable upper temperature limit for the heat transfer medium when the temperature of the heat transfer medium reaches the allowable upper temperature limit.

19. The method according to claim 16, further comprising:
adjusting a flow rate of the reactant gas on the basis of the temperature of the heat transfer medium such that the temperature of the gas mixture is kept within the predetermined temperature range.

20. The method according to claim 16, further comprising:
limiting an amount of electric power extracted from the fuel cell when flow rate of the reactant gas is decreased.

21. The method according to claim 16, further comprising:
adjusting at least one of a flow rate or a pressure of the circulating reactant gas on the basis of the temperature of the heat transfer medium such that the temperature of the reactant gas mixture is kept within the predetermined temperature range.

22. A fuel cell system comprising:
electric power generating means that electrochemically reacts a reactant gas mixture to generate electric power;
reactant gas supplying means that supplies a reactant gas;
gas circulating means that mixes a circulating reactant gas from the electric power generating means with the reactant gas to supply the reactant gas mixture to the electric power generating means;
temperature controlling means having a cooling flow path, a circulating pump that circulates a heat transfer medium through the electric power generating means, and a radiator on the cooling flow path to adjust the temperature of the heat transfer medium;
gas temperature detecting means that detects an inlet reactant gas mixture temperature of the reactant gas mixture before the reactant gas mixture enters the electric power generating means;
heat exchange means in the electric power generating means through which an outlet side of the reactant gas mixture and an inlet side of the heat transfer medium flows, the heat exchange means configured to exchange heat between the reactant gas mixture and a portion of the heat transfer medium; and
controlling means programmed to:
determine a target inlet side temperature of the heat transfer medium based on a reactant gas supply unit temperature, a reactant gas flow rate, and a reactant gas mixture flow rate, the target inlet side temperature determined to maintain the inlet reactant gas mixture temperature within a predetermined range; and
adjust a temperature of the heat transfer medium to achieve the target inlet side temperature by controlling the temperature control unit.

* * * * *